(12) United States Patent
Nance

(10) Patent No.: US 7,274,310 B1
(45) Date of Patent: Sep. 25, 2007

(54) AIRCRAFT LANDING GEAR KINETIC ENERGY MONITOR

(76) Inventor: C. Kirk Nance, 720 Whitley Rd., Keller, TX (US) 76248

( * ) Notice: Subject to any disclaimer, the term of this patent is extended or adjusted under 35 U.S.C. 154(b) by 260 days.

(21) Appl. No.: 11/225,602

(22) Filed: Sep. 13, 2005

Related U.S. Application Data

(63) Continuation-in-part of application No. 11/092,020, filed on Mar. 29, 2005, now Pat. No. 7,193,530.

(60) Provisional application No. 60/688,624, filed on Jun. 8, 2005.

(51) Int. Cl.
 *G08B 21/00* (2006.01)
(52) U.S. Cl. .............. 340/960; 244/100 R; 244/102 R; 267/64.26
(58) Field of Classification Search ................. 340/960; 244/100 R, 102 R; 267/64.26
See application file for complete search history.

(56) References Cited

U.S. PATENT DOCUMENTS

| | | | |
|---|---|---|---|
| 2,587,628 A | 3/1952 | King | |
| 3,273,382 A | 9/1966 | Fonash | |
| 3,401,388 A | 9/1968 | Phillips | |
| 3,517,550 A | 6/1970 | Leventhal | |
| 3,712,122 A | 1/1973 | Harris et al. | |
| 3,946,358 A | 3/1976 | Bateman | |
| 4,278,219 A | 7/1981 | Finance | |
| 4,302,827 A | 11/1981 | Rosenblum | |
| 4,528,564 A | 7/1985 | Trampnau | |
| 4,770,372 A * | 9/1988 | Ralph | 244/102 R |
| 4,869,444 A * | 9/1989 | Ralph | 244/104 FP |
| 4,979,154 A | 12/1990 | Brodeur | |
| 5,214,586 A | 5/1993 | Nance | |
| 5,260,702 A | 11/1993 | Thompson | |
| 5,406,487 A | 4/1995 | Tanis | |
| 5,511,430 A | 4/1996 | Delest et al. | |
| 5,548,517 A | 8/1996 | Nance | |
| 6,012,001 A | 1/2000 | Scully | |
| 6,128,951 A | 10/2000 | Nance | |
| 6,237,406 B1 | 5/2001 | Nance | |
| 6,237,407 B1 | 5/2001 | Nance | |
| 6,293,141 B1 | 9/2001 | Nance | |
| 6,588,282 B2 | 7/2003 | Arms | |
| 6,676,075 B2 | 1/2004 | Cowan et al. | |
| 2005/0033489 A1 | 2/2005 | Tezuka | |

* cited by examiner

*Primary Examiner*—Jeffery Hofsass
*Assistant Examiner*—Samuel J. Walk
(74) *Attorney, Agent, or Firm*—Geoffrey A. Mantooth

(57) ABSTRACT

A system for use in monitoring, measuring, computing and displaying the Kinetic Energy generated and experienced while aircraft are executing either normal, overweight or hard landing events. Pressure sensors and motion sensors are mounted in relation to each of the landing gear struts to monitor, measure and record the impact loads and aircraft touch-down vertical velocities experienced by landing gear struts, as the aircraft landing gear initially comes into contact with the ground. Velocity adjustments are made to correct for errors caused by landing gear per-charge pressure and landing gear strut seal friction. The system also measures the landing loads experienced by each landing gear strut during the landing event and determines if aircraft limitations have been exceeded.

20 Claims, 5 Drawing Sheets

Apparatus – Block Diagram

AIRCRAFT LANDING GEAR KINETIC ENERGY MONITOR

This application is a continuation-in-part of application Ser. No. 11/092,020, filed Mar. 29, 2005 now U.S. Pat. No. 7,193,530 and also claims the benefit of provisional patent application Ser. No. 60/688,624, filed Jun. 8, 2005.

BACKGROUND OF THE INVENTION

An aircraft is typically supported by plural pressurized landing gear struts. Each landing gear strut is designed much like, and incorporates many of the features of a typical shock absorber. Designs of landing gear incorporate moving components which absorb the impact force of landing. Moving components of an aircraft landing gear shock absorber are commonly telescopic elements connected by a scissor-link. The scissor-link incorporates a hinge, allowing the arms of the scissor link to move with the telescopic elements of the strut. An alternate type of landing gear incorporates a trailing arm design, where the main supporting element of the landing gear is hinged with a trailing arm. The hinge design of major elements of this gear performs the function of the scissor link. The shock absorber of the landing gear strut comprises internal fluids, both hydraulic fluid and compressed nitrogen gas and function to absorb the vertical descent forces generated when the aircraft lands. Aircraft have limitations regarding the maximum allowable force the aircraft landing gear and other supporting structures of the aircraft can safely absorb when the aircraft lands. Landing force limitations are a key factor in determining the maximum landing weight for a particular aircraft type.

Aircraft landing force is often referred to as Kinetic Energy (KE) and is commonly expressed in the equation—Kinetic Energy equal one half of the mass, times the velocity squared:

$$KE = \frac{mV^2}{2}$$

where:
KE is Kinetic Energy.
m is the mass or weight of the aircraft.
V is the Velocity (vertical speed) at which the mass comes into contact with the ground.

Aircraft routinely depart from an airport with the aircraft weight less than the maximum take-off weight limitation, but greater than the maximum landing weight limitation. During the flight, in-route fuel is burned to reduce the aircraft weight below the maximum landing weight limitation. Situations can arise where the aircraft has left the departure airport, and the pilot discovers the need to immediately return and land, without the time, nor opportunity, to burn-off the planned in-route fuel. This causes an overweight landing event. When an overweight landing occurs, the FAA (Federal Aviation Administration) and aircraft manufacturer require an inspection of the landing gear and the connections of the landing gear to the aircraft to check for damage. This is a visual inspection done manually, by trained aircraft technicians.

Title 14-Part 25, Chapter § 25.473 of the current FAA regulations define the assumed maximum vertical velocity at which an aircraft would come into contact with the ground as being ten feet per second (10 fps). The origination of this rule comes from the Civil Aeronautics Board—Civil Air Regulations, Part 4, Chapter § 4.24, dated: Nov. 9, 1945. Today an aircraft's maximum landing weight (MLW) limitation is determined by the manufacturer, who must design the structural integrity of the aircraft to allow for the weight/mass to land at an assumed vertical velocity of 10 fps. These limitations assume the aircraft is landing with each of the main landing gear simultaneously touching the ground and the landing force being equally distributed between the two main landing gears. However, cross-wind landings are a common occurrence. In cross-wind situations, the pilot will adjust the lateral angle of the aircraft to lower the wing pointed in the direction of the cross-wind. Lowering this windward wing aides in stabilizing the aircraft against a sudden gust of stronger cross-wind; but also increases the possibility that the aircraft will have an asymmetrical landing gear touch-down. Currently there are no devices installed on aircraft to monitor individual landing gear touch-down velocities.

The present invention will describe an alternate means to perform the required aircraft inspection, by automatically sensing aircraft landing gear strut, touch-down velocities, measured during the initial ground contact of each respective landing gear, at every landing event; and determining if the touch-down forces have exceeded the aircraft limitations.

As the aircraft descends towards the runway, the landing gear is extended. The landing gear maintains a pre-charge pressure within the shock strut, even though no weight is applied to the strut. The pre-charge pressure is a relatively low pressure, which is maintained to insure the landing gear shock absorber component is extended to full strut extension, prior to landing. At full extension, the shock absorber can absorb its maximum amount of landing force. As the aircraft landing gear come into initial contact with the ground, the minimal pre-charge pressure within the strut easily allows for the shock absorber to begin compressing. As the strut continues to compress, internal strut pressures increase, allowing the strut to absorb the landing force.

Multiplying the strut pre-charge pressure times the cross-sectional area of the shock strut will determine a weight value which corresponds to the amount of opposing force that would reduce the rotation of the scissor-link or trailing arm hinge of the landing gear during the initial contact with the ground. Any opposing force applied to the initial touch-down velocity would reduce that velocity by reducing the rate of landing gear scissor link hinge rotation.

Subsequent adjustments to this reduction in velocity can be made to correct for this opposing force, in the determination of actual Kinetic Energy transferred during the landing event. As the landing gear comes into initial contact with the ground, the strut begins to compress, thereby increasing the pressure within the shock absorber. Increases in pressure, beyond the pre-charge pressure, creates additional resistance to the compression of the landing gear strut.

Beyond the measurement of initial touch-down velocity, the rate of the slower rotation associated with the amount and rate of internal shock absorber pressure is valuable data and will be used in monitoring the landing loads applied to these structural members. Landing load data (corrected from the distortions caused by strut pre-charge pressure and landing gear strut seal friction) accumulated with every aircraft landing event, will be stored and used to build an accurate life history of the landing gear. A comparison is made between actual landing load data and the aircraft manufacturer's assumption of landing gear use or possible abuse; to develop the documentation necessary, with engineering review, to allow increases in the life limitation of the aircraft landing gear system.

The FAA requires flight data recorders (FDR) on transport category aircraft. The FDR incorporates multi-axis accelerometers (located at the center of gravity of the aircraft hull) which measure various shock loads that become evident in an abrupt landing event. The accelerometer data is usually not available unless an accident has occurred, and the FDR is removed from the aircraft, the data downloaded, and then analyzed. Assuming one might attempt to determine aircraft landing gear touch-down velocity from the FDR data, the information would be merely calculations from measurements taken not at the respective landing gear locations of the aircraft, but along the center-line of the aircraft. The FDR calculations would not be associated with the touch-down velocity of any respective landing gear strut, but the velocity of the aircraft hull as a whole.

A research of prior art identifies numerous system which measure aircraft descent velocity. Though it is advantageous for pilots to know the average descent velocity or sink-rate of the aircraft while approaching a runway for landing, the actual descent velocity can vary drastically due to non-pilot actions including such factors as varying wind conditions. The descent velocity of the aircraft hull the does not necessarily indicate the touch-down velocity of any respective landing gear strut as it comes into initial contact with the ground.

Prior art to determine aircraft descent velocity is well documented. Reference is made to U.S. Pat. No. 3,712,122—Harris; U.S. Pat. No. 6,012,001—Scully, and U.S. Pat. No. 4,979,154—Brodeur. These and other patents describing similar but subtly different techniques teaching the use of various range-finder devices, attached to the aircraft hull, which measure the distance between the aircraft hull and the ground, as well as the rate of change of those measurements. Unfortunately the range-finder devices do not measure the initial touch-down velocity of each respective landing gear, as they come into contact with the ground. For example, as an aircraft approaches a runway for landing, if the pilot properly flares the aircraft, the descent velocity of the aircraft will dramatically reduce just a few feet above the runway surface. During the aircraft flare procedure, a cushion of air is developed by the downward force of air generated by the wing coming near the ground surface. This cushion of air is often referred to as "ground effect" and can substantially reduce the descent velocity of the aircraft. In ground effect, the aircraft is reaching a stall situation which reduces the lifting force generated by the wings. Aircraft wing oscillation can occur, where the aircraft wings flutter from side to side. This is another situation where an asymmetrical landing gear touch-down will occur. Aircraft descent velocity, measured along the centerline of the aircraft, will not detect wing oscillation and will not determine the initial touch-down velocity experienced by each individual land gear, when the aircraft comes into initial contact with the ground.

Additional search of prior art relating to landing gear identified U.S. Pat. No. 2,587,628—King, which teaches an apparatus for testing "yieldable load carrying structures" such as aircraft landing gear. King teaches monitoring the rate of deceleration of the mass supported by the landing gear and the effects on other connected landing gear elements. King teaches the relationship between the telescopic rate of compression of the landing gear, as compared to shear deflection to other structural members of that same landing gear. King teaches apparatus used as a tool to determine the effective change in the fatigue life limitations of a particular landing gear structural component, by tracking the rate of change in force applied to the shock absorbing components attached to said fatigue life limited structural component.

U.S. Pat. No. 3,517,550—Leventhal, teaches the relationship of comparing internal strut pressure increases, as related to the rate of landing gear strut compression, thereby determining the rate of change in descent velocity. Though the approach may appear valid, it is subject to error by its inability to verify, at any given landing event, the exact proportion of gas volume in relation to hydraulic oil volume, within the landing gear strut. My U.S. Pat. No. 6,128,951—Nance teaches the measuring of strut pressure within each landing gear strut, as well as determining the current proportion or ratio of gas to hydraulic oil within each respective landing gear strut. Internal strut pressure, compared to strut extension, is not a linear relationship. Commonly aircraft maintenance technicians observed landing gear struts which appear near deflated, due to hydraulic oil having escaped through the strut seals. Mistakenly assuming the landing gear has lost nitrogen gas, the technician adds additional gas to the strut, thus the landing gear strut is now over-charged with gas. The now changed and unknown volume of gas being compressible and that variance in volume of gas as compared to the unknown volume of non-compressible hydraulic oil having changed, would thereby vary the compression rate of the landing gear strut and generate errors in the velocity calculation. Also, pressure within a landing gear strut is contained by the friction of the landing gear strut seals. My U.S. Pat. No. 5,214,586—Nance teaches distortions in landing gear strut pressure measurements caused by landing gear strut seal friction. Landing gear strut seal friction can distort internal strut pressure measurements by as much as 5% of the applied weight. Attempts to determine initial touch-down velocity of the landing gear strut would be subject to errors caused by the friction of the strut seals distorting pressure measurements and delaying any increases in internal landing gear strut pressure. These delays in any increase in strut pressure due to strut seal friction would distort the accuracy of a direct comparison of rate of internal pressure increases to strut compression.

This invention relates to differences and improvements to the stated prior art. Combining the prior art of Leventhal and Nance might develop a tool to calculate various factors that might distort initial pressure changes as they relate to initial strut compression. An actual vertical velocity measurement, as described herein, would be superior to any calculation using assumed factors. The new invention described herein surpasses the prior art calculations by mechanically measuring the rotation rate of vertically rotating landing gear structural components such as the scissor link hinge and/or trailing arm hinge as the aircraft landing gear strut comes into initial contact with the ground. The arms of the scissor link hinge form an angle. That angle changes as the landing gear comes into initial contact with the ground and begins to compress (as with telescopic type design) or collapse (as with trailing arm design). Measurement of the angle change, as well as rate of angle change, can be accomplished by installing a mechanical rotation sensor at the vertex point of the angle. The rotation sensor is attached to the hinge point of the arms of the scissor link component of the landing gear strut. Measurements of the rotation of the scissor-link hinge can be monitored at rates up to 40,000 samples per second, with the ability of measuring vertex angle changes within $1/100^{th}$ of a degree. The speed and ability to identify the initial and most minor changes in hinge angle, by hinge rotation, allows the initial touch-down velocity to be measured and determined, before the strut has compressed to a point the touch-down velocity would be reduced by pressure build-up, beyond the pre-charge pressure. Additional measurements, taken after initial rotation, are considered inaccurate due to velocity reduction caused by additional opposing pressure build-up in the strut.

SUMMARY OF THE INVENTION

It is one object of the present invention to measure respective aircraft landing gear kinetic energies.

It is another object of the present invention to provide a tool to automatically determine if a kinetic energy limitation has been exceeded, in determining overweight landings and hard landing events.

It is another object of the present invention to provide a tool to compile a touch-down kinetic energy, or force, data history, for each landing gear strut to be used to evaluate landing gear fatigue life and potential landing gear life or cycle escalations.

It is another object of the present invention, as an aid to better monitor the utilization of the aircraft landing gear system as compared to the manufacturer's life cycle limitations, to monitor the rate and amount of compression of each respective landing gear strut and/or angle change of trailing arm, net of distortions caused by pre-charge pressure and frictional forces within the landing gear strut.

It is another object of the present invention, to better monitor the utilization of the aircraft landing gear system as compared to the manufacturer's life cycle limitations, to monitor and compare asymmetrical touch-down kinetic energies of each respective landing gear strut.

The present invention provides a method of monitoring landing gear on an aircraft during a landing event of the aircraft. Each landing gear comprising a telescopic strut with a compressible fluid, which telescopic strut is capable of extension. Each landing gear further comprising linkage members which are capable of rotation. A descent velocity of the aircraft on at least one of the telescopic struts is measured, during the landing event of the respective landing gear with the ground. The mass of the aircraft supported by the respective landing gear strut is measured as it increases through the landing event. The amount of force applied to the respective landing gear is determined for the measured descent velocity and mass. An indication of the force is provided.

In accordance with one aspect of the present invention, the step of measuring descent velocity further comprises measuring the extension of the one telescopic strut in relation to elapsed time.

In accordance with another aspect of the present invention, the step of measuring the extension of the one telescopic strut further comprises measuring the rotation of at least one of the respective linkage members.

In accordance with another aspect of the present invention, the step of measuring the rotation of at least one of the linkage members further comprises the step of measuring the rotation of the one linkage member relative to the adjacent linkage member and the same landing gear with a mechanical rotation sensor.

In accordance with another aspect of the present invention, the step of measuring the relative rotation of at least one of the linkage members further comprises measuring the relative rotation with a rotational variable differential transformer.

In accordance with still another aspect of the present invention, the step of measuring the relative rotation of at least one of the linkage members further comprises measuring the relative rotation with a rotary potentiometer.

In accordance with still another aspect of the present invention, the step of measuring the extension of one of the telescopic struts further comprises measuring the inclination of one of the respective linkage members.

In accordance with another aspect of the present invention, the inclination of the aircraft hull, before and during contact with the landing gear and the ground is measured. The measured extension of the one telescopic strut is compensated with the measured aircraft hull inclinations.

In accordance with still another aspect of the present invention, the step of measuring the increasing mass of the aircraft supported by the respective landing gear further comprises the step of measuring the pressure inside the one telescopic strut in relation to elapsed time during the landing event.

In accordance with still another aspect of the present invention, a determination is made if the amount of force applied to the respective landing gear exceeds a predetermined amount. If so, then an indication is provided.

In accordance with still another aspect of the present invention, the descent velocity of the aircraft is measured for all of the telescopic struts. Then for all struts, it is determined if the amount of force applied to each landing gear exceeds a predetermined amount. Any strut that has experienced an amount of force exceeding the predetermined amount is then identified.

In accordance with still another aspect of the present invention, the aircraft hull inclination before and during contact of the respective gear with the ground is measured. The step of determining the amount of force further comprises the step of compensating the descent velocity with the measured aircraft hull inclinations.

The present invention also provides an apparatus for monitoring landing gear of an aircraft during a landing event when landing gear contacts the ground. Each landing gear comprises a telescopic landing gear strut with a compressible fluid. Each landing gear comprising a rotatable linkage. A pressure sensor is provided for each telescopic strut. The respective pressure sensor is coupled to the respective telescopic strut so as to measure pressure inside the respective telescopic strut. A rotation sensor is coupled to the rotatable linkage of at least one of the landing gear so as to measure the extension of the respective telescopic strut. A processor has first inputs connected to the pressure sensor and second inputs connected to the rotation sensors. The processor determines the amount of force applied to each landing gear during the landing event by determining the descent velocity on the respective landing gear and determining the mass supported by the respective landing gear and providing an output for the amount of force. An indicator is connected to the processor output.

In accordance with one aspect of the present invention, the rotatable linkage comprises at least two linkages that rotate with respect to each other as the telescopic strut extends. The rotation sensor further comprises a rotary sensor that senses the rotation of the two linkages.

In accordance with another aspect of the present invention, the rotary sensor is located at a rotatable coupling of the two linkages.

In accordance with still another aspect of the present invention, the rotatable linkage comprises at least two linkages that rotate with respect to each other as the telescopic strut extends. The rotation sensor further comprising an inclinometer coupled to one of the linkages.

In accordance with still another aspect of the present invention, a hull inclinometer is coupled to the aircraft hull. The processor has an input that is connected to the hull inclinometer. The processor compensates the measurements from each inclinometer with the measurements from the hull inclinometer to determine descent velocity for each telescopic strut.

In accordance with still another aspect of the present invention, a hull inclinometer is coupled to the aircraft hull. The processor has an input that is connected to the hull inclinometer. The processor compensates the measurements from each rotation sensor with the measurements from the hull inclinometer to determine descent velocity for each telescopic strut.

In accordance with another still aspect of the present invention, the processor determines if the amount of force applied to each telescopic strut exceeds a predetermined threshold, and if so provides an output to the indicator.

BRIEF DESCRIPTION OF THE DRAWINGS

Although the features of this invention, which are considered to be novel, are expressed in the appended claims, further details as to preferred practices and as to the further objects and features thereof may be most readily comprehended through reference to the following description when taken in connection with the accompanying drawings, wherein:

DETAILED DESCRIPTION OF THE PREFERRED EMBODIMENT

Figure 1:
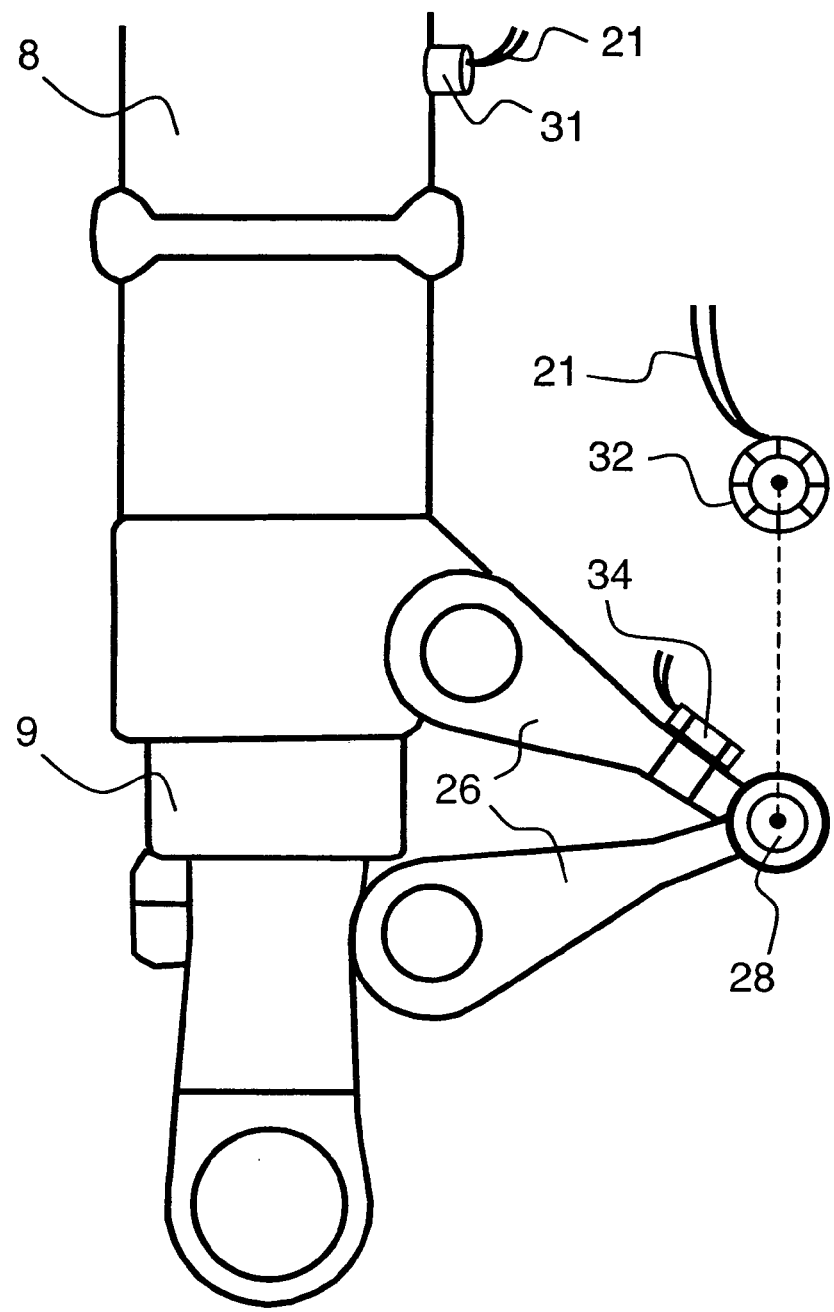
FIG. 1 is a side view of a typical telescopic design commercial airliner landing gear strut with attached components of the invention.

The present invention measures and determines the descent velocity of the aircraft, experienced by each landing gear strut on initial contact with the ground. The descent velocity is used to determine stresses applied to the landing gear. If the velocities are too high, then an indication is provided so that an inspection of the landing gear can be performed.

In addition, the present invention measures and determines the amount of force applied to the landing gear over the landing event period of time. This is a longer period of time than initial contact of the landing gear with the ground. The amount of force is used to determine stresses applied to the landing gear. If the stresses are too high, then an indication is provided so that an inspection of the landing gear can be performed.

The recording and accumulation of stress information for the landing gear on landing provides a history that can be used to determine life cycles and routine maintenance and inspections of the landing gear.

The present invention detects initial movement of the landing gear strut by monitoring the rotation, and rate of rotation, of vertically rotating structural components of each of the landing gear struts. Strut movement includes strut extension and compression. Strut movement is also referred to herein as strut extension (which includes strut compression). The rotating structural components in a telescopic landing gear design would be the hinge of the scissor link, which is connected to each of the telescopically moving components of the landing gear. The scissor link has components that rotate vertically; the components rotate about a generally horizontal axis, which is coaxial to the hinge pin of the scissor link. A trailing arm landing gear design has a similar hinge rotation, found at multiple locations on the landing gear; but the most practical location is the hinge that attaches the trailing arm of the landing gear to that portion of the gear which is connected to the aircraft hull. Rotation of landing gear hinge components, which identifies telescopic movement of the landing gear shock strut, will hereafter be referred to as landing gear strut movement or strut extension. The detection and rate of landing gear strut movement are determined during the initial contact period of the landing gear with the ground. The initial contact is prior to any reduction in descent velocity and strut movement caused by the opposing forces. Such opposing forces of landing gear strut movement include: pre-charge pressure, increases to that pre-charge pressure, and strut seal friction. Pressure changes within the landing gear strut are caused by compression of the landing gear strut, during the landing of the aircraft. The pressure increase is generated by the reduction in aircraft forward airspeed and reduction in wing lift. Rotation at the hinge point of the scissor link of the landing gear strut is affected by the telescopic movement of the landing gear strut. Movement of each of the landing gear struts is detected by monitoring the rotation of the strut linkages. Upon detection of the initial rotational movement of a respective landing gear strut, the step of monitoring the rate and amount of additional rotation is used to determine the initial touch-down, or descent, velocity of each respective strut, during initial contact.

Monitoring the velocity of the movement in the landing gear strut upon initial contact alone will determine initial descent velocity, but will not determine the precise amount of Kinetic Energy transferred throughout the entire landing event. The landing event occurs when the landing gear contacts the ground and the weight of the aircraft fully settles on the landing gear. As the airspeed of the aircraft reduces, lift generated by the wing reduces; thereby continually increasing the weight/mass applied to the landing gear, until there is no wing-lift remaining. Tracking the multiple relationships between: 1) reduction in airspeed, 2) reduction in wing lift, 3) reduction in rate of rotation of landing gear hinge components, 4) increased internal strut pressure, 5) all measured against elapsed time, would better determine the overall Kinetic Energy force applied during the entire landing event. The initial touchdown of the aircraft landing gear does not absorb the entire amount of Kinetic Energy generated during the landing event. As the airspeed of the aircraft reduces, wing-lift reduces, resulting in an increase of the mass supported by the landing gear. Tracking Kinetic Energy, as it develops and would be transferred during the landing event, can be accomplished by measuring rotational movement of landing gear components along with measured pressure increases within the landing gear shock strut. The initial touch-down velocity being measured at initial ground contact is subsequently reduced by forces being applied in opposition to the compression of the landing gear strut. The first of those opposing forces are generated by two factors: 1) the pre-charge pressure within the landing gear strut, and 2) landing gear strut seal friction. Corrections can made to the initial touch-down velocity measurements to compensate for these opposing forces, to further aid in the determination of load forces applied during the landing event. Determination of strut seal friction values, the association of friction with internal strut pressure and the effects of weight values of the landing gear strut are taught in the prior art. The amount of landing gear strut seal friction changes in relation to the amount of internal pressure contained within that strut. The higher the internal strut pressure, the higher the strut seal frictional forces. The pre-charge pressure is relatively a low pressure; therefore the distorting friction value is low. The opposing force value from the strut seal friction can be measured in pounds per square inch (psi).

The pre-charge pressure within each landing gear strut, as well as the pressure equivalent caused by strut seal friction are measured, monitored and determined prior to the landing event. Multiplying the pre-charge pressure, and the pressure equivalent caused by strut seal friction, times the cross-sectional area of the landing gear strut shock absorber will determine a weight/mass value corresponding to the opposing forces being applied against strut compression or collapse.

Determining an adjusted initial touch-down velocity, with corrections made for pre-charge pressure and strut seal friction; can be best stated by the following equation:

$$V_a = \sqrt{\frac{(m + m_{pc} + m_f)V^2}{m}}$$

where:

$V_a$=adjusted touch-down Velocity, in feet per second (fps)

V=measured touch-down Velocity, right main landing gear for the example below: 5 fps m=measured mass supported, right main landing gear for the example below: 21,000 lbs $m_{pc}$=opposing mass, being pre-charge pressure equivalent, right main landing gear for the example below: 112 psi or, (112 psi×12.56 si=1407 lbs)

$m_f$=opposing mass, being seal friction equivalent pressure, right main landing gear for the example below: 11 psi or, (11 psi×12.56 si=138 lbs)

Example $$V_a = \sqrt{\frac{(m + m_{pc} + m_f)V^2}{m}}$$

$$V_a = \sqrt{\frac{(21,000 + 1,407 + 138) \times 25}{21,000}}$$

$$V_a = \sqrt{\frac{22,545 \times 25}{21,000}}$$

-continued $$V_a = \sqrt{\frac{563,625}{21,000}}$$

$V_a$=94

$V_a$=5.181 fps

Considering the weight/mass applied to any one landing gear, that mass will increase as the wing lift reduces, and additional load is transferred to that landing gear. The opposing internal strut pressure within the landing gear will increase due to the shock absorbing characteristics of the strut, thereby additionally reducing descent velocity.

Determining the change and rate of change in Kinetic Energy throughout the un-loading of wing lift requires determination of the rate the weight/mass increases, compared to the reducing rate of descent velocity. Once initial touch-down velocity measurements have been made, additional calculations are be made to determine the amount and rate of weight/mass increases and corrected for distortions caused by increasing opposing pressure within the landing gear strut. These relationships are recorded and compared to the manufacture's life limitations.

Referring now to the drawings, wherein like reference numerals designate corresponding parts throughout the several views and more particularly to FIG. 1 thereof, there is shown the lower portion of a typical commercial aircraft landing gear shock strut consisting of one oleo-type shock strut 8 and a forged steel telescoping piston 9. Piston 9 is restricted from turning within the cylinder of strut 8 by a strut scissor-link 26. Strut scissor-link 26 incorporates a hinge pin 28 that connects two scissor arms. A mechanical rotation sensor 32, is attached to strut scissor-link 26 at hinge pin 28 in a manner which allows the rotation sensor 32 to measure the movement of each respective arm of scissor-link 26, in relation to the other arm and to hinge pin 28. The vertical rotational and angular measurement of the strut scissor-link movement is a method of mechanically determining and measuring strut extension and strut compression. The telescoping movement of piston 9 in relation to strut 8 is calculated as related to the rotation measurements recorded by rotation sensor 32. As the landing gear is deployed prior to landing, the strut 8 and piston 9 are extended, wherein the angle of the scissor link 26 will be large. When the aircraft has landed, the angle will be small. Furthermore, the rotation sensor 32 measures strut scissor-link 26 movement and thereby monitors piston movement in relation to elapsed time. Alternatively, other sensors and arrangements, such as an inclinometer 34 mounted on one of the arms of the scissor-link 26, can be used to measure the piston movement. The inclinometer 34 measures the change in inclination of one of the scissor arm 26, relative to horizontal. The inclination of the scissor arms will change to more horizontal as the aircraft lands. A pressure sensor 31 is also provided on each strut 8 to measure the internal pressure therein. Strut scissor link 26 hinge rotation measurements from rotation sensor 32 are sent by wiring harness 21 to an onboard processor 41 (see FIG. 5) which calculates and identifies the initial touch-down velocity of each respective strut. The processor 41 has inputs that are connected to the rotation sensors 32, one input per sensor. Each landing gear strut (nose, left-main, right-main) has a rotation sensor 32 (or an inclinometer 34). The processor 41 also has inputs that are connected to the pressure sensors 31, one input per sensor. Each landing gear strut 8 (nose, left-main, right-main) has a pressure sensor 31. The processor 41 has an output connected to an indicator 43. The indicator 43 can be in the cockpit and can be a display, gauge, etc. If a display, the indicator can be integrated with other information, particularly in a "glass" cockpit, which has displays that provide multiple types of information.

Figure 2:
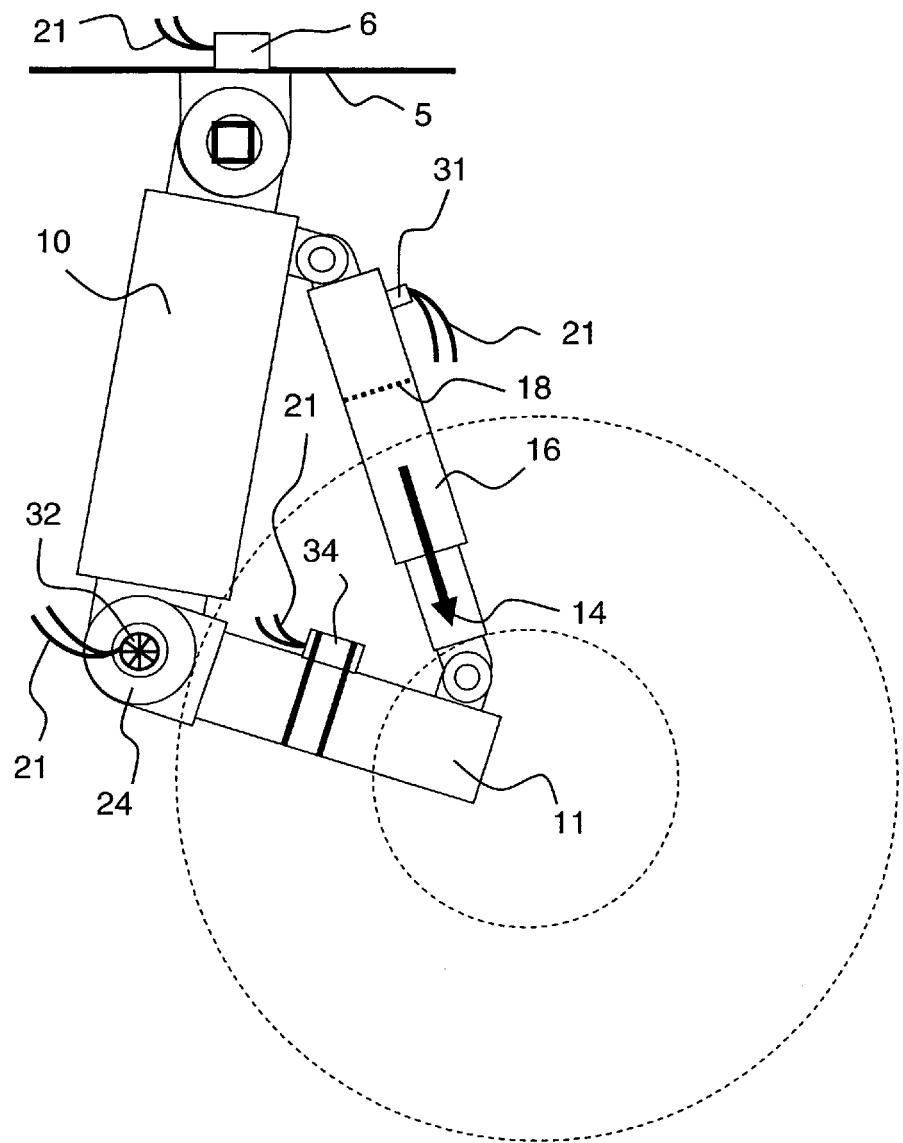
FIG. 2 is a side view of a typical trailing arm design commercial airliner landing gear strut with attached components of the invention.

Referring now to FIG. 2, there is shown a different configuration of a typical landing gear referred to here as alternate strut 10, which is commonly used on smaller regional type aircraft. Alternate strut 10 is designed with a trailing arm 11. In this configuration the loads experienced at aircraft landing are transferred to the internal pressure within shock absorber 16. Internal pressure measurements, in relation to loads experienced during aircraft landing are measured by pressure sensor 31. Signals relative to internal pressures within shock absorber 16, are sent to the onboard processor 41 (see FIG. 5) via wiring harness 21. The onboard processor 41 also receives varying angle and landing gear position information via wiring harness 21 from inclinometer 34 mounted on strut trailing arm 11, or alternatively rotation sensor 32 attached to trailing arm hinge 24. The strut 10 and trailing arm 11, are connected across by the cylinder-piston of the shock absorber 16, and functions as an alternate type of scissor-link (as illustrated in FIG. 1). Shock absorber 16 maintains a pre-charge pressure, to insure the landing gear is fully extended prior to initial touch-down, and that pre-charge pressure force is illustrated by arrow 14. Internal strut pressure is prevented from escape by internal strut seal 18. Trailing arm 11 vertical rotational movement is measured by the inclinometer 34 or the rotation sensor 32. Inclinometer 6 is attached to the aircraft hull 5 to monitor and measure the changing aircraft hull angle during the landing event. As the aircraft starts the landing event, the hull of the aircraft changes angle and the comparison of that changing aircraft hull angle, to landing gear trailing arm angle, is made to correct errors in trailing arm angle determinations.

The present invention also works on larger landing gear designs which utilize pivoting truck beams. Truck beams are horizontal (while on the ground) structural members which allow the use of 4 wheels on a single landing gear. Prior to the aircraft landing event, the landing gear truck beam maintains an non-horizontal angle, which allows the trailing wheels to come into contact with the ground, prior to the forward wheels coming into contact with the ground.

The landing gear strut may not be vertical upon initial contact. The hull inclinometer 6 can be used to determine the angle of the strut with vertical. This in turn can be used to determine, and compensate if necessary, for the force experienced by the landing gear with the ground.

Figure 3:
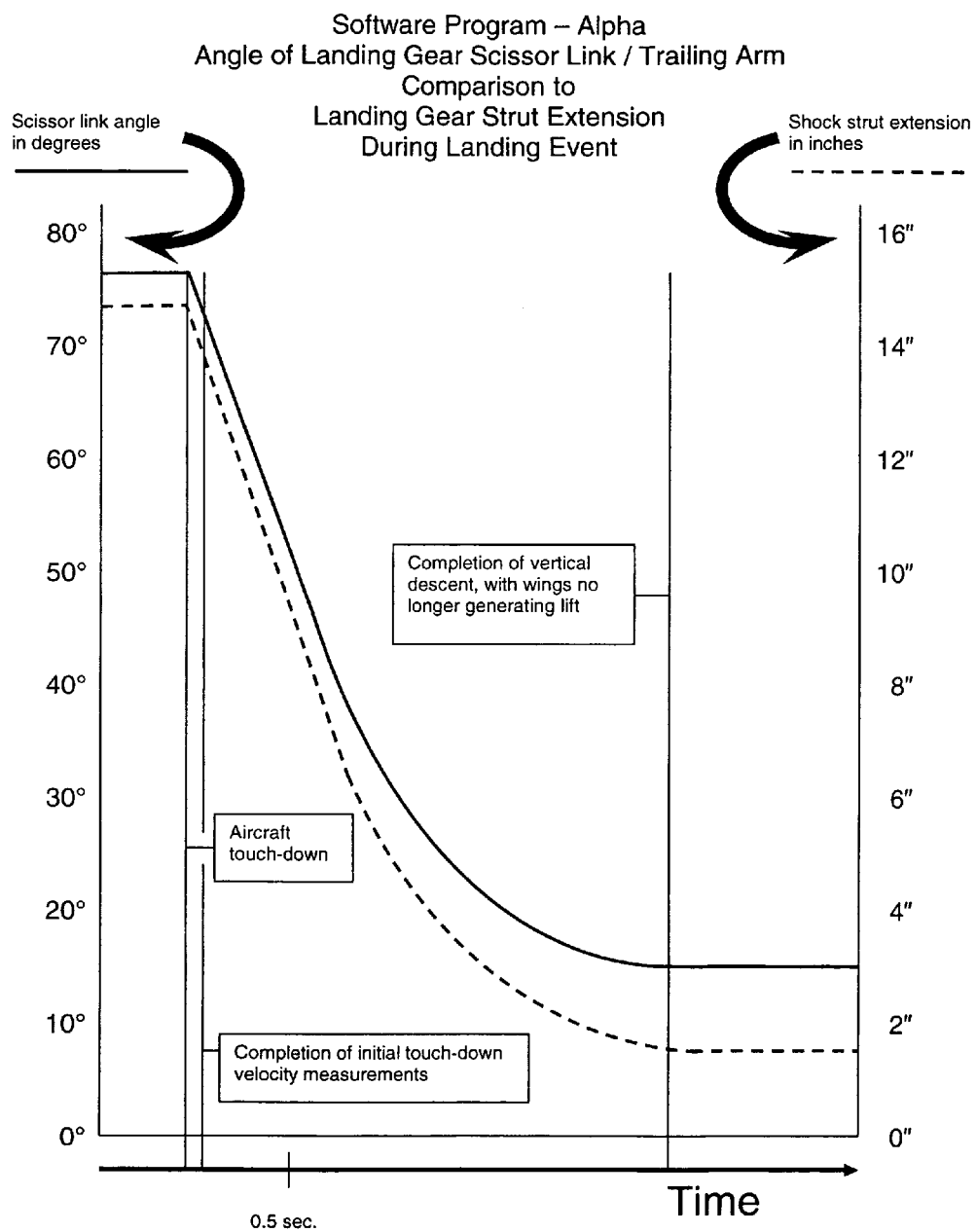
FIG. 3 is an illustration of Software Program Alpha which compares rotation of landing gear scissor link/trailing arm to landing gear strut extension, in relation to elapsed time, during aircraft landing event.

Referring now to FIG. 3, there is shown an illustration of software program Alpha—Angle of Landing Gear Scissor Link/Trailing Arm Comparison to Landing Gear Strut Extension, which compares the measured angle (in degrees) of the landing gear strut scissor link 26 (FIG. 1), to the amount of telescopic extension (in inches) of the landing gear strut 8 (FIG. 1), in relation to elapsed time. Scissor link 26 is merely a hinge to allow the telescopic extension of the landing gear strut. Trailing arm 11 can also be considered a similar hinge, to allow extension of shock absorber 16 (FIG. 2). The measurements of strut extension (including compression) made by way of the scissor link 26 or trailing arm 11 are independent of the amounts of liquid or gas inside of the struts 8, 16. The amount of landing gear strut extension or compression is determined by measuring the angle changes by rotation sensor 32 (FIGS. 1 and 2). The information in FIG. 3 can be in a formula look-up table, stored in memory of the processor 41. The rotatable linkages of scissor link 26 form two defined sides of a triangle, with the hinge point acting as the varying vertex angle. Simple geometry allows for the determination of the variable third side of the triangle, being the amount of telescopic strut extension. The processor 41 records the measurements from the rotation sensors 32 in relation to elapsed time. If inclinometers 6, 34 are used, then the processor records the measurements in relation to elapsed time. The comparison of strut compression in relation to elapsed time determines the touch-down velocity experienced during a landing event.

Descent velocity of the aircraft at initial contact of the landing gear with the ground is determined. The descent velocity experienced by each landing gear strut is determined. The descent velocity is the compression distance of the strut over the brief period, as the landing gear come into initial contact with the ground. Shock absorber 16 maintains a minimum pre-charge pressure to insure the piston 9 of the landing gear strut 8 is fully extended, prior to a landing event. This pre-charge pressure commonly ranges from 105 psi to 115 psi. When the full weight of the aircraft is resting on the landing gear, the internal pressure can reach pressure in excess of 1,800 psi. Considering the pressure in shock absorber 16 (or strut 8) increases as the strut compresses, the rate of increase in pressure begins slowly as the strut begins to compress and internal pressure rises rapidly as the volume within the strut is reduced. Considering the rising of internal strut pressure would reduce the compression rate of shock strut 16 (or strut 8), measurement of strut trailing arm (or scissor link) rotation must be made at the initial point of strut movement and measurements must cease before internal shock strut pressure would reduce the velocity of the trailing arm (or scissor link) movement and thereby distort the initial touch-down, or descent, velocity calculations.

Thus, as illustrated in FIG. 3, the descent velocity of the aircraft at initial contact is determined as follows. First, the extension of each strut is measured before the strut contacts the ground. Then, during initial contact of the strut with the ground, the strut extension (actually compression) is measured in relation to elapsed time. The period of initial contact is brief, lasting only a fraction of a second. The processor 41 provides the descent velocity upon initial contact to the indicator. The descent velocity is zero before initial contact. At initial contact, the descent velocity is high. The descent velocity then decreases throughout the remainder of the landing event, as the aircraft settles on its landing gear. In addition, the processor 41 determines if the descent velocity for each strut exceeds a predetermined threshold (for example, 10 fps) The threshold for the nose strut may be smaller than the threshold for the main struts. If the threshold is not exceeded, then no further indication is provided. If the threshold is exceeded by one or more struts, then an indication is provided that identifies the strut or struts and the amount the descent velocity exceeds the threshold. This indication is used for inspection purposes. Mechanics can access the information, see which, if any, struts need inspection, and then carry out the inspection of the strut and airframe.

Figure 4:
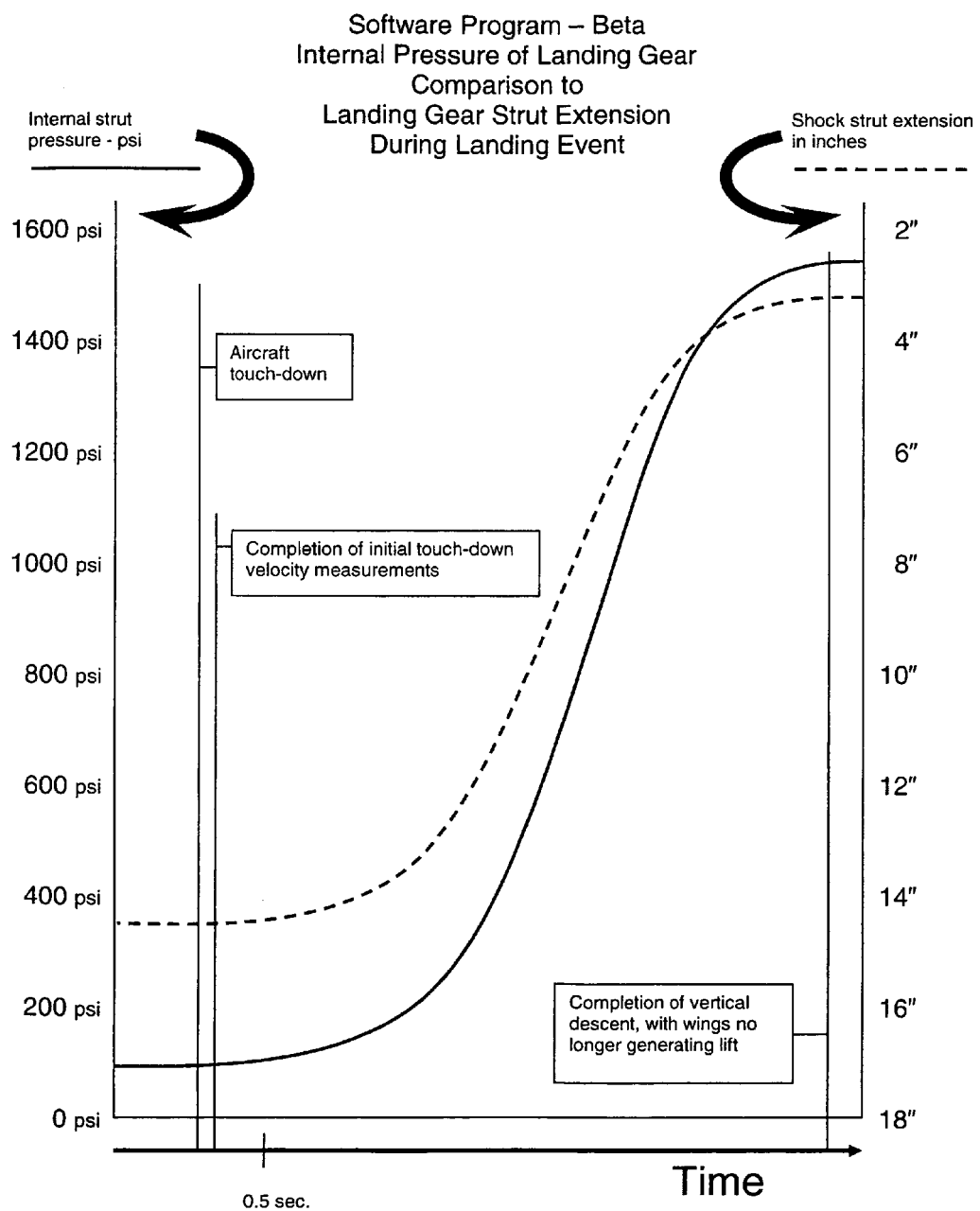
FIG. 4 is an illustration on Software Program Beta which compares strut pressure increases to landing gear strut extension, in relation to elapsed time, during aircraft landing events.

Referring now to FIG. 4, there is shown an illustration of software program Beta—Internal Pressure of Landing Gear Comparison to Landing Gear Strut Extension, which compares changes in strut pressure in relation to strut extension, in relation to elapsed time. This program, executed by the processor 41, also determines the force or Kinetic energy applied to teach landing gear strut during the landing event. As previously stated, the rate of pressure change compared to strut extension, in relation to elapsed time is not linear. Rapid measurements taken at the initial contact of landing gear touch-down reduces the error that would be evident with similar measurements record throughout the entire compression of the landing gear strut. FIG. 4 also illustrates a method to determine the amount of force generated and transferred through the landing gear structure, at any given time during the landing event. The multiple and varying amounts of Kinetic Energy can be calculated by: 1) multiplying measured strut pressure (corrected for errors due to pre-charge pressure and strut seal friction) by the square inches of load supporting surface area within the strut, this calculation being to determine the amount of mass applied to the strut at any single point of time; and 2) measuring the speed at which the various and multiple mass values are applied, which is accomplished by monitoring the speed of the landing gear rotational movement described in FIGS. 1-3. Comparing the calculated mass value, (being a single value of the multiple values of mass experienced during the landing event) to the speed at which the mass is applied, will determine the Kinetic Energy applied at that point in time. Multiple measurements taken throughout the landing event will determine the build-up of Kinetic Energy, as well as the total amount of energy applied through the landing event.

Thus, the amount of force applied to each landing gear strut is determined by comparing the aircraft descent velocity, to the aircraft mass, on each strut during the landing event. To measure the descent velocity, the strut extension is measured just prior to contacting the ground. As the strut contacts the ground, the extension is measured in relation to elapsed time. The mass of the aircraft, as supported by each landing gear strut is also measured. This is accomplished by measuring strut pressure from just prior to contacting the ground, through the landing event, in relation to elapsed time. The Kinetic Energy for each instance of time is determined. The Kinetic Energy is zero before initial contact. After initial contact, the Kinetic Energy rises to a peak and falls back to zero during the landing event. The processor 41 provides the peak Kinetic Energy, and also if desired, the entire Kinetic Energy over the landing event, to the indicator. The processor 41 also determines if the Kinetic Energy has exceeded a predetermined threshold for each landing gear strut. If so, then an indication is provided that identifies the strut and how much over the threshold the Kinetic Energy was exceeded. Mechanics can access the information and if necessary conduct an inspection of the overstressed strut.

Figure 5:
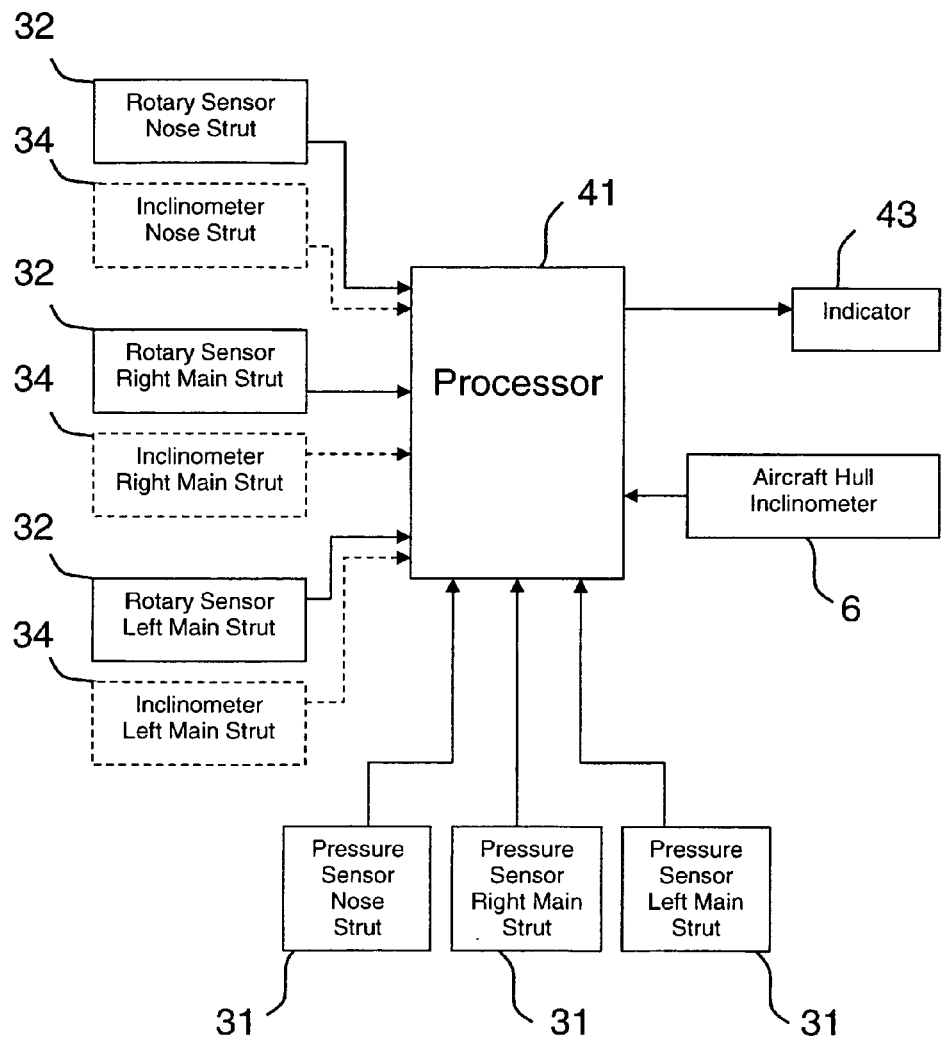
FIG. 5 is a block diagram showing the apparatus of the present invention, in accordance with a preferred embodiment.

Referring now to FIG. 5, there is shown a block diagram illustrating the apparatus of the invention, where multiple (nose, left-main and right-main gear) pressure sensors 31, rotary sensors 32, and inclinometers 34; input into processor 41. Aircraft hull inclinometer 6 also inputs into processor 41. Processor 41 outputs determinations and information and displays on indicator 43.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

What is claimed is:

1. A method of monitoring landing gear on an aircraft during a landing event of the aircraft, each landing gear comprising a telescopic strut with a compressible fluid, which telescopic strut is capable of extension, each landing gear further comprising linkage members which are capable of rotation, comprising the steps of:
   a) measuring a descent velocity of the aircraft on at least one of the telescopic struts during the landing event of the respective landing gear with the ground;
   b) measuring the mass of the aircraft supported by the respective landing gear as the mass increases through the landing event;
   c) determining the amount of force applied to the respective landing gear from the measured descent velocity and mass;
   d) providing an indication of the force.

2. The method of claim 1, wherein the step of measuring the descent velocity further comprises the step of measuring the extension of the one telescopic strut in relation to elapsed time.

3. The method of claim 2, wherein the step of measuring the extension of the one telescopic strut further comprises the step of measuring the rotation of at least one of the respective linkage members.

4. The method of claim 3 wherein the step of measuring the rotation of at least one of the linkage members further comprises the step of measuring the rotation of the one linkage member relative to an adjacent linkage member in the same landing gear, with a mechanical rotation sensor.

5. The method of claim 4 wherein the step of measuring the relative rotation of at least one of the linkage members further comprises the step of measuring the relative rotation with a rotational variable differential transformer.

6. The method of claim 4 wherein the step of measuring the relative rotation of at least one of the linkage members further comprises the step of measuring the relative rotation with a rotary potentiometer.

7. The method of claim 2 wherein the step of measuring the extension of one of the telescopic gear struts further comprises the step of measuring the inclination of one of the respective linkage members.

8. The method of claim 7 further comprising the steps of:
   a) measuring the inclination of the aircraft hull before and during contact of the landing gear with the ground;
   b) compensating the measured extension of the one telescopic strut with the measured aircraft hull inclinations.

9. The method of claim 8 wherein the step of measuring the increasing mass of the aircraft supported by the respective landing gear further comprises the step of measuring the pressure inside the one telescopic strut in relation to elapsed time during the landing event.

10. The method of claim 1 wherein the step of measuring the increasing mass of the aircraft supported by the respective landing gear further comprises the step of measuring the pressure inside the one telescopic strut in relation to elapsed time during the landing event.

11. The method of claim 1 further comprising the steps of:
   a) determining if the amount of force applied to the respective landing gear exceeds a predetermined amount;
   b) providing an indication if the amount of force exceeds the predetermined amount.

12. The method of claim 11 wherein:
   a) the step of measuring the descent velocity of the aircraft on at least one of the telescopic struts further comprises the step of measuring the descent velocity of the aircraft on all of the telescopic struts;
   b) the step of determining if the amount of force applied to the respective landing gear exceeds a predetermined amount further comprises the step of determining if the amount of force applied to each landing gear exceeds a predetermined amount;
   c) identifying which strut has experienced an amount of force exceeding the predetermined amount.

13. The method of claim 1, further comprising the steps of:
   a) measuring the aircraft hull inclination before and during contact of the respective landing gear with the ground;

b) the step of determining the amount of force further comprising the step of compensating the descent velocity with the measured aircraft hull inclinations.

14. An apparatus for monitoring landing gear of an aircraft during a landing event when the landing gear contacts the ground, each landing gear comprising a telescopic landing gear strut with a compressible fluid, each landing gear comprising a rotatable linkage, comprising:
   a) a pressure sensor for each said telescopic strut, said respective pressure sensor being coupled to said respective telescopic strut so as to measure pressure inside said respective telescopic strut;
   b) a rotation sensor or each said telescopic strut, said respective rotation sensor coupled to the rotatable linkage of the respective landing gear so as to measure the extension of the respective telescopic strut;
   c) a processor having first inputs connected to the pressure sensors and having second inputs connected to the rotation sensors, the processor determining the amount of force applied to each landing gear during the landing event by determining the descent velocity on the respective landing gear and determining the changing amounts of mass supported by the respective landing gear and providing an output for the amount of force;
   d) an indicator connected to the processor output.

15. The apparatus of claim 14 wherein the rotatable linkage comprises at least two linkages that rotate with respect to each other as the telescopic strut extends, the rotation sensor further comprises a rotary sensor that senses the rotation of the two linkages.

16. The apparatus of claim 15 wherein the rotary sensor is located at a rotatable coupling of the two linkages.

17. The apparatus of claim 14 wherein the rotatable linkage comprises at least two linkages that rotate with respect to each other as the telescopic strut extends, the rotation sensor further comprises an inclinometer coupled to one of the linkages.

18. The apparatus of claim 17 further comprising:
   a) a hull inclinometer coupled to the aircraft hull;
   b) the processor has an input that is connected to the hull inclinometer, the processor compensating the measurements from each inclinometer with the measurements from the hull inclinometer to determine descent velocity for each telescopic strut.

19. The apparatus of claim 14 further comprising:
   a) a hull inclinometer coupled to the aircraft hull;
   b) the processor has an input that is connected to the hull inclinometer, the processor compensating the measurements from each rotation sensor with the measurements from the hull inclinometer to determine descent velocity for each telescopic strut.

20. The apparatus of claim 14 wherein the processor determines if the amount of force applied to each telescopic strut exceeds a predetermined threshold and if so provides an output to the indicator.

* * * * *